United States Patent Office 3,576,796
Patented Apr. 27, 1971

3,576,796
MIXED METALLIFEROUS MONOAZO COMPLEXES
Marcel Georges Jirou and Claude-Marie Henri Emile Brouard, Sotteville-les-Rouen, France, assignors to Ugine Kuhlmann, Paris, France
No Drawing. Filed Mar. 15, 1967, Ser. No. 623,225
Claims priority, application France, Mar. 15, 1966, 53,424
Int. Cl. C09b 45/16
U.S. Cl. 260—145
6 Claims

ABSTRACT OF THE DISCLOSURE

Mixed chromiferous complexes are provided of the type:

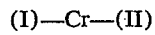(I)—Cr—(II)

in which (I) represents the residue of a monoazo dyestuff of the general formula:

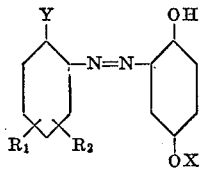

wherein X represents a methyl or ethyl group, Y represents a group capable of taking part in the formation of a metalliferous complex, and $R_1$ and $R_2$ each represent hydrogen or halogen atoms or alkyl, alkoxy or nitro groups, (II) represents the residue of a monoazo dyestuff of the general formula:

A—N=N—B in which A represents the residue of a monosulphonated o-aminophenol or o-aminonaphthol possibly containing non-solubilising substituents and B represents the residue of a coupling compound.

---

The invention includes animal or polyamide fibres coloured with such complexes.

The invention also includes a process for the manufacture of such complexes which comprises reacting in aqueous alkaline medium a chromium complex of an aliphatic or aromatic o-hydroxycarboxylic acid with an equimolecular mixture of dyestuffs of Formulae I and II; it also includes a process for the manufacture of such complexes which comprises reacting, in aqueous alkaline medium, a 1/1 chromium complex of a dyestuff of Formula II with a dyestuff of Formula I.

The present invention relates to new mixed metalliferous complexes represented by the following scheme:

(I)—Cr—(II)    (III)

in which (I) represents the residue of a monoazo dyestuff of the general formula:

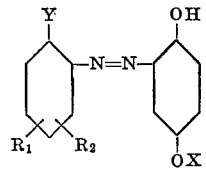

in which X represents a methyl or ethyl group, Y represents a group capable of taking part in the formation of a metalliferous complex, $R_1$ and $R_2$ each represent hydrogen or halogen atoms or alkyl, alkoxy or nitro groups, and (II) represents the residue of a monoazo dyestuff of the general formula:

A—N=N—B in which A represents the radical of a monosulphonated o-arinophenol or o-aminonaphthol and possibly containing non-solubilising substituents, and B represents the residue of a coupling compound.

Hydroxy, methoxy and carboxy groups may be mentioned as examples of groups capable of taking part in the formation of a metalliferous complex. Suitable coupling compounds from which is derived residue B are, for example, phenols, naphthols, pyrazolones, or acetyl-acetarylides in which the positions adjacent to the hydroxy or keto functions are free for the coupling reaction.

The monoazo dyestuffs of Formula I, which are necessary for the preparation of the chromium complexes of Formula III, may be obtained in a known manner by coupling, in alkaline medium, p-methoxy- or p-ethoxyphenol with the diazo derivatives of amines of the general formula

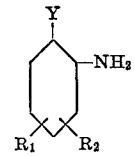

Suitable amines are, for example, 4-chloro-1-hydroxy-2-aminobenzene, 4,6-dichloro-1-hydroxy-2-aminobenzene, 4 - nitro - 1 - hydroxy-2-aminobenzene, 5-nitro-1-hydroxy-2-aminobenzene and 4,6 - dinitro-1-hydroxy-2-amino-benzene.

The mixed complexes of Formula III, may be obtained, for example, by reacting, in aqueous alkaline medium a chromium complex of an aliphatic or aromatic o-hydroxycarboxylic acid, such as for example salicylic or tartaric acids, with an equimolecular mixture of the dyestuffs of Formulae I and II; a 1/1 chromium complex of a dyestuff of Formula II may also be reacted, in aqueous alkaline medium, with a dyestuff of Formula I.

The mixed complexes thus obtained are especially suitable for dyeing, preferably in the presence of a weak organic acid for example in an acetic acid medium, animal fibres such as silk, leather or wool, and synthetic fibres based on polyamides or polyurethanes, as well as mixed fibres, for example wool-polyamides. The shades obtained show as a whole good fastness to rubbing and to wet tests and excellent fastness to light.

The invention is illustrated by, but not limited to the following examples in which the parts indicated are parts by weight and the temperatures are in degrees centigrade.

EXAMPLE 1

The chromium complex obtained from 43.9 parts of [6-nitro-4-sulpho-2-hydroxy-naphthalene]-<1 azo 1>-[2-hydroxy-naphthalene] containing one atom of chromium per molecule of monoazo dyestuff and 28.9 parts of [4-nitro-1-hydroxy-benzene]-<2 azo 2>-[4-methoxy-1-hydroxy-benzene] are mixed in 1000 parts of water. The mixture is heated to 90–100° C. and caustic soda is added so that the pH rises progressively to 8-8.5. The mixture is kept at 90-100° C. until the monoazo compound disappears. The mixed chromiferous dyestuff is salted out with sodium chloride and dried. It dyes wool and polyamides a black shade having very good general fastness. Mixtures of these two fibres do not shown differences in shade.

The table below describes other mixed chromiferous complexes of Formula III. The shades indicated are the colorations obtained with these complexes on wool and polyamides.

| Ex. | (I) | (II) | Shades |
|---|---|---|---|
| 2 | [3,5-dinitro-2-hydroxy-benzene]-<1 azo 2>-[4-methoxy-1-hydroxy-benzene]. | [6-nitro-4-sulpho-2-hydroxy-naphthalene]-<1 azo 1>-[2-hydroxy-naphthalene]. | Greenish black. |
| 3 | [4-nitro-2-hydroxy-benzene]-<1 azo 2>-[4-methoxy-1-hydroxy-benzene]. | ____do____ | Bluish black. |
| 4 | [5-nitro-2-hydroxy-benzene]-<1 azo 2<-[4-methoxy-1-hydroxy-benzene]. | [5-nitro-3-sulpho-2-hydroxy-benzene]-<1 azo 4>-[5-hydroxy-1-phenyl-3-methyl-pyrazole]. | Dark brown |
| 5 | [4-nitro-2-hydroxy-benzene]-<1 azo 2>-[4-methoxy-1-hydroxy-benzene]. | [4-sulpho-2-hydroxy-naphthalene]-<1 azo 1>-[2-hydroxy-naphthalene]. | Navy blue. |

We claim:
1. Mixed chromiferous complex of the type:

(I)—Cr—(II)

in which (I) represents a monoazodyestuff of the formula:

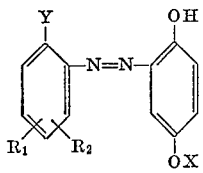

wherein X represents methyl or ethyl, Y represents the hydroxy, methoxy or carboxy group, and $R_1$ and $R_2$ each represent hydrogen, chlorine, methoxy or nitro groups, and (II) represents a monoazo dyestuff of the formula:

A—N=N—B wherein A represents one of the following:

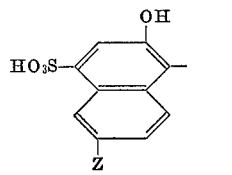

or

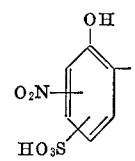

in which Z is hydrogen or nitro, and B represents 2-hydroxy-1-naphthyl or 5-hydroxy-1-phenyl-3-methyl-4-pyrazolyl.

2. Complexes as claimed in claim 1 in which Y represents hydroxy, $R_1$ represents hydrogen and $R_2$ represents chlorine in the 4 position relative to Y.

3. Complexes as claimed in claim 1 in which Y represents hydroxy and $R_1$ and $R_2$ each represent chlorine with one being in the 4 position and the other in the 6 position relative to Y.

4. Complexes as claimed in claim 1 in which Y represents hydroxy, $R_1$ represents hydrogen and $R_2$ represents nitro in the 4 position relative to Y.

5. Complexes as claimed in claim 1 in which Y represents hydroxy, $R_1$ represents hydrogen, and $R_2$ represents nitro in the 5 poistion relative to Y.

6. Complexes as claimed in claim 1, in which Y represents hydroxy and $R_1$ and $R_2$ each represent nitro with one being in the 4 position and the other being in the 6 position relative to Y.

References Cited
UNITED STATES PATENTS 1,984,096 12/1934 Straub et al. _____ 260—145X
2,906,746 9/1959 Brassel et al. _____ 260—145

CHARLES B. PARKER, Primary Examiner

D. M. PAPUGA, Assistant Examiner

U.S. Cl. X.R.

260—163, 194, 206; 8—13, 42, 43, 55